United States Patent
Chen et al.

(10) Patent No.: US 10,841,877 B2
(45) Date of Patent: Nov. 17, 2020

(54) METHOD OF TASK SCHEDULING IN A WIRELESS SENSOR NETWORK

(71) Applicant: PEGATRON CORPORATION, Taipei (TW)

(72) Inventors: Bo-Rong Chen, Taipei (TW); Tzu-Min Yang, Taipei (TW); Wen-Pin Li, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 81 days.

(21) Appl. No.: 16/149,079

(22) Filed: Oct. 1, 2018

(65) Prior Publication Data
US 2019/0166554 A1 May 30, 2019

(30) Foreign Application Priority Data
Nov. 24, 2017 (TW) .............................. 106140948 A

(51) Int. Cl.
  *H04W 52/02* (2009.01)
  *H04W 4/38* (2018.01)
  *H04W 84/18* (2009.01)

(52) U.S. Cl.
  CPC ......... *H04W 52/0216* (2013.01); *H04W 4/38* (2018.02); *H04W 84/18* (2013.01)

(58) Field of Classification Search
  CPC ... H04W 52/0216; H04W 4/38; H04W 84/18; Y02D 70/162
  See application file for complete search history.

(56) References Cited

U.S. PATENT DOCUMENTS

2015/0036570 A1* 2/2015 Jeong ................ H04W 52/0216
                                             370/311

FOREIGN PATENT DOCUMENTS

| CN | 101136854 A | 3/2008 |
| CN | 102387521 A | 3/2012 |
| CN | 102928019 A | 2/2013 |

* cited by examiner

*Primary Examiner* — Dady Chery
(74) *Attorney, Agent, or Firm* — Winston Hsu

(57) ABSTRACT

A management nodal point of a wireless sensor network (WSN) receives a plurality of tasks and stores the tasks in a buffer. Each of the tasks would be assigned to and executed by a corresponding one of execution nodal points of the WSN. The management nodal point records a status of each execution nodal point as an executable status or a non-executable status. Before the management nodal point assigns a first task, the management nodal point obtains the status of a first execution nodal point corresponding to the first task. If the first execution nodal point is at the executable status, the management nodal point assigns the first task to the first execution nodal point according to a predetermined rule.

8 Claims, 5 Drawing Sheets

| Symbol of execution nodal point | Status code of nodal point | Number of cumulative failures |
|---|---|---|
| 30A | 0 | N1 |
| 30B | 1 | N2 |
| 30C | 1 | N3 |
| 30D | 1 | N4 |
| 30E | 0 | N5 |
| 30F | 1 | N6 |
| ……… | ……… | ……… |

FIG. 3

METHOD OF TASK SCHEDULING IN A WIRELESS SENSOR NETWORK

CROSS REFERENCE TO RELATED APPLICATION

This application claims priority of Taiwan application No. 106140948, which was filed on Nov. 24, 2017, and is included herein by reference.

BACKGROUND OF THE INVENTION

1. Field of the Invention

The present invention relates to a method of task scheduling in a wireless sensing network, and more particularly to a method for improving efficiency of task scheduling in a wireless sensing network.

2. Description of the Prior Art

A wireless sensor network (WSN) is a wireless communications network composed of a number of automatic devices distributed in space. These devices use sensors to cooperatively monitor physical or environmental conditions (such as temperature, sound, vibration, pressure, motion or contaminants) at different locations. The wireless sensor networks are originally developed from military applications such as battlefield monitoring. Today's wireless sensor networks are used in many civilian applications, such as environmental and ecological monitoring, health monitoring, home automation, and traffic control.

However, when a regular wireless sensing network assigns a task to a nodal point, if the nodal point cannot receive or perform a task due to damage of its sensor, powerlessness, or entering a sleep mode, it will not only cause unnecessary waste of power, but also cause adverse effects on transmitting the tasks of the wireless sensing network since the task is transmitted wirelessly.

SUMMARY OF THE INVENTION

An embodiment of the present invention provides a method of task scheduling in a wireless sensor network (WSN). The method comprises a management nodal point of the WSN receiving a plurality of tasks, and storing the tasks in a buffer, wherein each of the tasks is assigned to and executed by a corresponding one of execution nodal points of the WSN; the management nodal point recording a status of each of the execution nodal points as an executable status or a non-executable status; before the management nodal point assigns a first task of the tasks, the management nodal point obtaining a status of a first execution nodal point corresponding to the first task; and if the first execution nodal point is in the executable status, the management nodal point assigning the first task to the first execution nodal point according to a predetermined rule.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a data structure diagram of a lookup table shown in FIG. 1.

DETAILED DESCRIPTION

Figure 1:
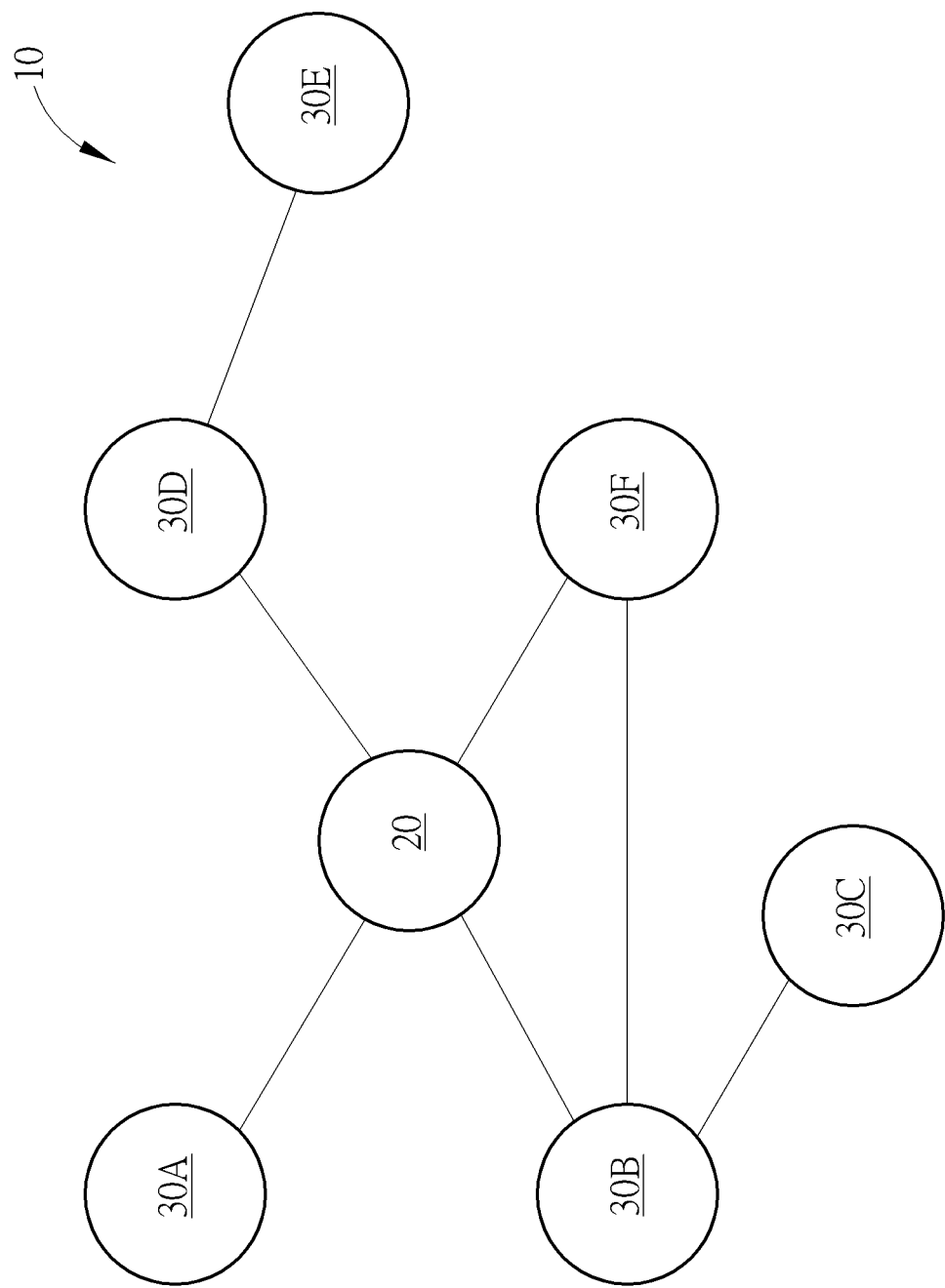
FIG. 1 is a schematic diagram of a wireless sensing network according to an embodiment of the present invention.
Figure 2:
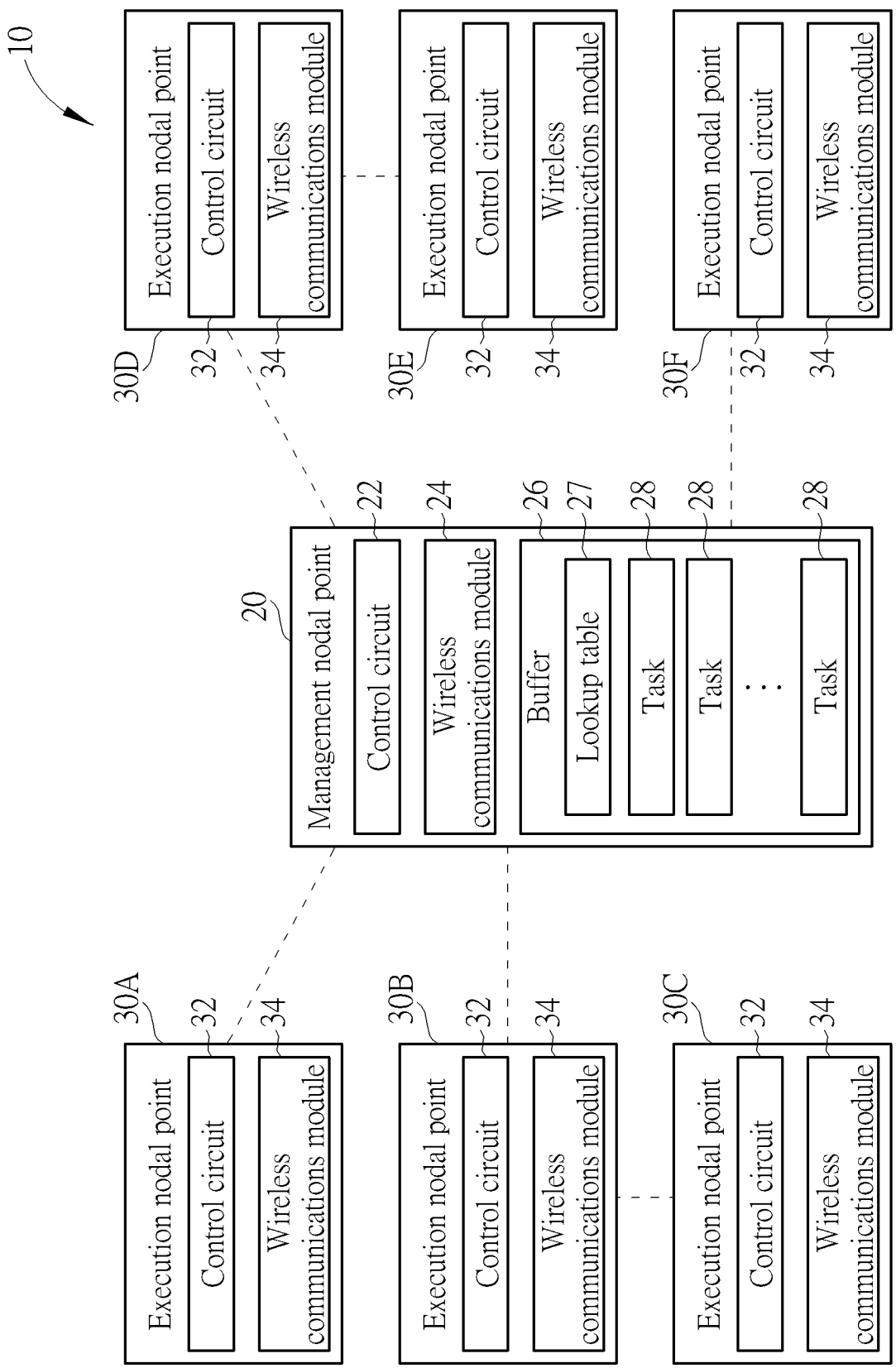
FIG. 2 is a functional block diagram of the wireless sensing network of FIG. 1.

Please refer to FIGS. 1 and 2. FIG. 1 is a schematic diagram of a wireless sensor network (WSN) 10 according to an embodiment of the present invention. FIG. 2 is a functional block diagram of WSN 10 of FIG. 1. The WSN 10 comprises a management nodal point 20 and a plurality of execution nodal points 30A to 30F. The management nodal point 20 communicates with the execution nodal points 30A to 30F wirelessly. In an embodiment of the invention, the WSN 10 is a ZigBee network, and the management nodal point 20 and the execution nodal points 30A to 30F perform wireless communications according to the specification of IEEE 802.15.4. However, the present invention is not limited thereto, and the WSN 10 may be a wireless network based on other specifications.

The management nodal point 20 is mainly configured to receive tasks from the cloud and assign the received tasks to corresponding execution nodal points 30A to 30F. The cloud can be an electronic device such as a server, a mobile phone, or a tablet, and can send tasks to the management nodal point 20 through a network. In addition, each task received by the management nodal point 20 would be assigned to one of the execution nodal points 30A to 30F of the WSN 10, and the corresponding execution nodal point performs the assigned task. The management nodal point 20 comprises a control circuit 22, a wireless communications module 24, and a buffer 26. The control circuit 22 is used to control the operations of the management nodal point 20, the wireless communications module 24 is used to receive tasks from the cloud and communicate wirelessly with the execution nodal points 30A to 30F, and the buffer 26 is used to store a lookup table 27 and store tasks 28 received from the cloud. In addition, each of the execution nodal points 30A to 30F has a control circuit 32 and a wireless communications module 34. The control circuit 32 is used to control the operations of execution nodal point 30A, 30B, 30C, 30D, 30E or 30F, and the wireless communications module 34 is used for wireless communicating with other wireless communications modules 34 and the wireless communications module 24 of the management nodal point 20.

In order to efficiently assign the received tasks to the corresponding execution nodal points 30A to 30F, the management nodal point 20 uses the lookup table 27 of the buffer 26 to record the status of each of the execution nodal points 30A to 30F. The status of each of the execution nodal points may be an executable status or a non-executable status. Please refer to FIG. 3. FIG. 3 is a data structure diagram of the lookup table 27 shown in FIG. 1. The lookup table 27 contains three fields 35, 36 and 38. The field 35 is used to record a symbol of each of the execution nodal points 30A to 30F. The field 36 is used to record a status code of each of the execution nodal points 30A to 30F. When the status code is "1", the corresponding execution nodal point is in the executable status and is capable of performing tasks. When the status code is "0", the corresponding execution nodal point is in the non-executable status and cannot perform any task. Taking the status codes depicted in FIG. 3 as an example, the execution nodal points 30A and 30E are in the non-executable status, and other execution nodal points 30B, 30C, 30D, and 30F are in the executable status. In addition, the field 38 is used to record a number of cumulative failures of each of the execution nodal points 30A to 30F. For example, N1, N2, N3, N4, N5 and N6 are the numbers of cumulative failures of the execution nodal points 30A, 30B, 30C, 30D, 30E and 30F, respectively. For more detail of using the lookup table 27, please refer to the following descriptions of FIG. 4.

Figure 4:
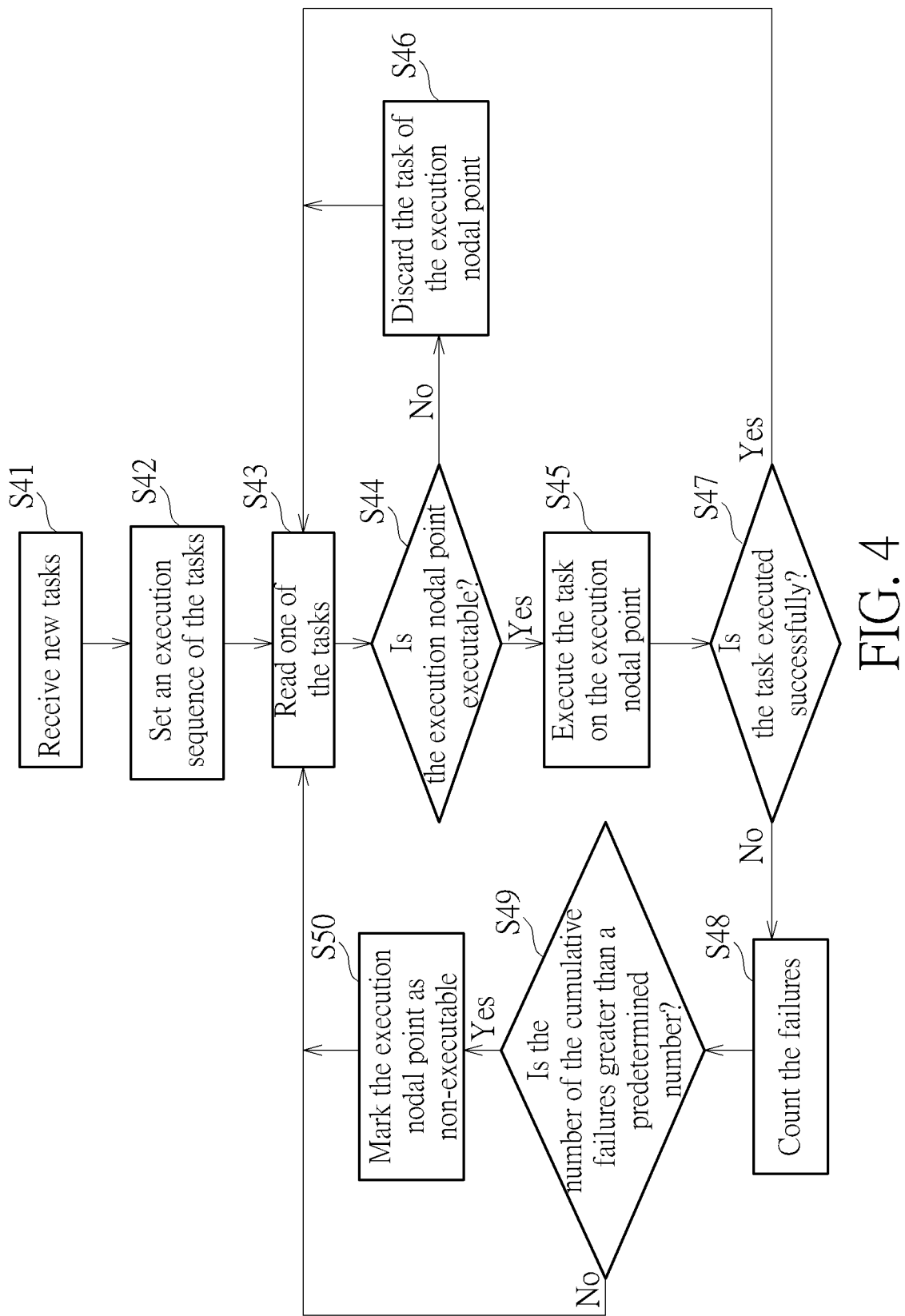
FIG. 4 is a flow chart of a method of task scheduling in a wireless sensing network according to an embodiment of the present invention.

Please refer to FIG. 4 with reference to FIG. 2. FIG. 4 is a flowchart of a method of task scheduling in the WSN 10 according to an embodiment of the present invention. The method comprises the following steps:

Step S41: the wireless communications module 24 of the management nodal point 20 receives new tasks 28 from the cloud.

Step S42: The control circuit 22 of the management nodal point 20 sets an execution sequence of the received tasks 28, and stores the tasks 28 in the buffer 26.

Step S43: The control circuit 22 of the management nodal point 20 reads one of the tasks 28 from the buffer 26 according to the execution sequence of the task 28 to prepare for assigning the read task 28.

Step S44: The control circuit 22 of the management nodal point 20 determines, according to the field 26 of the lookup table 27, whether the execution nodal point corresponding to the task 28 to be assigned is in the executable status; if the corresponding execution nodal point is in the executable status, step S45 is performed; however, if the corresponding execution nodal point is in the non-executable status, step S46 is performed.

Step S45: The control circuit 22 of the management nodal point 20 assigns the task 28 read in step S43 to the corresponding execution nodal points 30A, 30B, 30C, 30D, 30E or 30F via the wireless communications module 24 such that the control circuit 32 of the corresponding execution nodal point would execute the task 28 assigned by the management nodal point 20.

Step S46: The control circuit 22 directly discard the task 28 read in the step S43, and the control circuit 22 remove the task 28 from the buffer 26 since the control circuit 22 of the management nodal point 20 has recognized that the corresponding execution nodal point is in the non-executable status according to status recorded in the lookup table 27.

Step S47: The control circuit 22 of the management node 20 determines whether the corresponding execution nodal point successfully executes the assigned task according to whether or not there is a successful-execution message received from the execution nodal point executing the task 28 to notify the control circuit 22 that the task 28 has been executed successfully; if the corresponding execution nodal point has successfully executed the task, perform step S43 to continue to assign a next task; however, if the corresponding execution nodal point has failed to successfully execute the assigned task, perform step S48.

Step S48: The control circuit 22 of the management nodal point 20 counts the number of failures of the corresponding execution nodal point, and updates a corresponding entry of the field 38 in the lookup table 27.

Step S49: The control circuit 22 of the management nodal point 20 determines whether the cumulative number of failures corresponding to the execution nodal point is greater than a predetermined number, wherein the predetermined number is an integer greater than or equal to one, and can be set according to different usage conditions; if the cumulative number of failures corresponding to the execution nodal point is greater than the predetermined number, perform step S50; else perform step S43 to continue to assign the next task.

Step S50: The control circuit 22 of the management nodal point updates the lookup table 27 to update the status of the corresponding execution nodal point to the non-executable status (i.e., update the corresponding status code in the field 36 from "1" to "0").

From the above steps S47 to S50, when the management nodal point 20 assigns a predetermined number of tasks to an execution nodal point, if the management nodal point 20 does not receive any response from the execution nodal point, then the management nodal point 20 changes the status of this execution nodal point from the executable status to the non-executable status.

In an embodiment of the present invention, when the status of the execution nodal point recorded by the management nodal point 20 is the non-executable status, the management nodal point 20 changes the status of the execution nodal point recorded in the lookup table 27 from the non-executable status to the executable status if the management nodal point 20 receives a unicast or broadcast notification from an execution nodal point.

In an embodiment of the present invention, the control circuit 22 of the management nodal point 20 stores the tasks 28 in the buffer 26 according to a first in first out (FIFO) principle, so that tasks 28 first stored in the buffer 26 are first assigned by the management nodal point 20.

The control circuit 22 of the management nodal point 20 may store the tasks 28 in the buffer 26 according to a Leaky Bucket algorithm. When the buffer 26 completely fills with the tasks 28, the control circuit 22 of the management nodal point 20 discards any task 28 that is currently being transmitted to the management nodal point 20.

Figure 5:
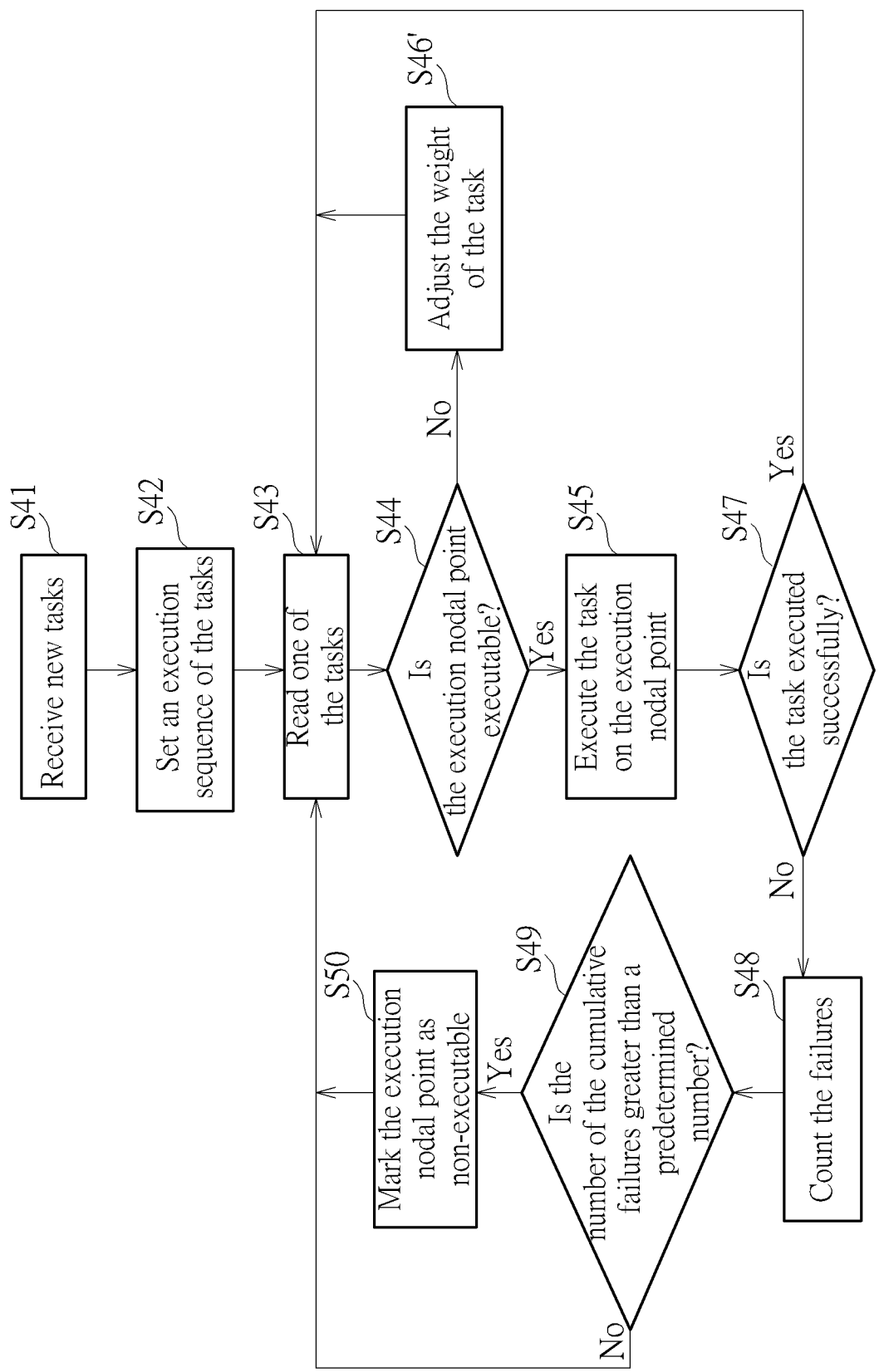
FIG. 5 is a flowchart of a method of task scheduling in a wireless sensing network according to another embodiment of the present invention.

In another embodiment of the present invention, step S46 may be modified. Please refer to FIG. 5. FIG. 5 is basically the same as FIG. 4. The main difference between the two figures is that step S46 of FIG. 4 is replaced by step S46' in FIG. 5, and only the difference is described herein. In step S46' of FIG. 5, after the management nodal point 20 recognizes that the corresponding execution nodal point is in the non-executable status, the management nodal point 20 may not discard the task 28 of the nodal point, but may adjust the weight of the task 28. The management nodal point 20 can assign different weights to each task 28. For example, tasks that cannot be performed can be given lower weights, while new tasks can be given higher weights. The management nodal point 20 may re-sort the task 28 according to the weight of each task 28 to set a new execution order of the tasks 28 (step S42). Thereafter, the task 28 with the highest weight is read first (step S43) and assigned.

In summary, the method of task scheduling in the wireless sensing network according to the embodiments of the present invention may determine whether to assign the tasks to the corresponding execution nodal point according to the status of each execution nodal point. If the execution nodal point is in the non-executable status, the tasks to be assigned can be directly discarded, and unnecessary transmission of tasks can be reduced. Therefore, the overall efficiency of assigning tasks in the wireless sensing network would be improved according to the present invention.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method of task scheduling in a wireless sensor network (WSN), the method comprising:
    a management nodal point of the WSN receiving a plurality of tasks, and storing the tasks in a buffer, wherein each of the tasks is assigned to and executed by a corresponding one of execution nodal points of the WSN;
    the management nodal point recording a status of each of the execution nodal points as an executable status or a non-executable status;
    before the management nodal point assigning a first task of the tasks, the management nodal point obtaining a status of a first execution nodal point corresponding to the first task;
    if the first execution nodal point is in the executable status, the management nodal point assigning the first task to the first execution nodal point according to a predetermined rule; and
    if the management nodal point does not receive any response from the first execution nodal point after the management nodal point assigns a predetermined number of tasks to the first execution nodal point, the management nodal point changing the status of the first execution nodal point from the executable status to the non-executable status, wherein the predetermined number is an integer greater than or equal to one.

2. The method of claim 1, further comprising:
    if the management nodal point receives a unicast or broadcast notification sent by the first execution nodal point when the status of the first execution nodal point recorded by the management nodal point is the non-executable status, the management nodal point changing the status of the first execution nodal point from the non-executable status to the executable status.

3. The method of claim 1, wherein the management nodal point records the status of the execution nodal points in a lookup table, and the management nodal point determines whether the first task should be assigned to the first execution nodal point according to the status of the first execution nodal point recorded in the lookup table before the management nodal point assigns the first task.

4. The method of claim 1, wherein the predetermined rule comprises:
    storing the tasks in the buffer according to a first in first out (FIFO) principle, so that tasks first stored in the buffer are first assigned by the management nodal point.

5. The method of claim 1, wherein the predetermined rule comprises:
    storing the tasks in the buffer according to a Leaky Bucket algorithm, and when the buffer is completely filled by the tasks, the management nodal point ignoring any task that is currently being transmitted to the management nodal point.

6. The method of claim 1, further comprising:
    if the status of the first execution nodal point obtained by the management nodal point is the non-executable status, the management nodal point discarding the first task from the buffer.

7. The method of claim 1, further comprising:
    if the status of the first execution nodal point obtained by the management nodal point is the non-executable status, the management nodal point sorting the received tasks according to weights of the execution nodal points so as to set an execution order of the tasks, and the management nodal point assigning the tasks according to the execution order.

8. The method of claim 1, wherein the WSN is a ZigBee network, and the management nodal point and the execution nodal points perform wireless communications according to specification of IEEE 802.15.4.

* * * * *